United States Patent [19]
Lin

[11] Patent Number: 6,052,422
[45] Date of Patent: Apr. 18, 2000

[54] ANALOG SIGNAL OFFSET CANCELLATION CIRCUIT AND METHOD

[75] Inventor: Jizoo Lin, Hsinchu, Taiwan

[73] Assignee: Winbond Electronics Corp., Hsinchu, Taiwan

[21] Appl. No.: 09/036,178

[22] Filed: Mar. 6, 1998

[30] Foreign Application Priority Data

Oct. 30, 1997 [TW] Taiwan .................................. 86116194

[51] Int. Cl.$^7$ ....................................................... H04L 7/00
[52] U.S. Cl. ............................................................ 375/355
[58] Field of Search .................................... 375/355, 375, 375/376, 316

[56] References Cited

U.S. PATENT DOCUMENTS

| | | | |
|---|---|---|---|
| 5,068,628 | 11/1991 | Ghoshal .................................. | 331/1 A |
| 5,455,847 | 10/1995 | Guilford et al. ........................ | 375/373 |
| 5,831,456 | 11/1998 | Sutardja .................................. | 327/100 |

*Primary Examiner*—Don N. Vo
*Assistant Examiner*—Phuong Phu
*Attorney, Agent, or Firm*—Ladas & Parry

[57] ABSTRACT

An analog signal offset cancellation circuit comprising a front end device, a comparator, a sampling device, a resampling clock generator and a recovery data generator is disclosed. In this offset cancellation circuit, the front end device receives an input analog signal. The comparator then compares the input analog signal with a threshold voltage to obtain an output binary signal. The sampling device samples the output binary signal by a sampling signal having a frequency N times that of the output binary signal to obtain sample data. The resampling clock generator then continually reads 2N samples of the sample data and outputs a two period resampling clock with its rising and falling edges determined by the edges and the number of uninterrupted logic one samples of the 2N samples. The resampling clock remains unchanged when the 2N samples are all logic one or all logic zero. The recovery data generator then samples the output binary signal using the resampling clock to obtain recovery data.

11 Claims, 4 Drawing Sheets

ANALOG SIGNAL OFFSET CANCELLATION CIRCUIT AND METHOD

FIELD OF THE INVENTION

The present invention relates in general to an analog signal offset cancellation circuit and method, which eliminates the analog signal offset by dynamic clock duty cycle.

BACKGROUND OF THE INVENTION

FIG. 1 (Prior Art) is a circuit diagram of a conventional circuit for converting an analog signal into a digital signal. The circuit consists of a front end device 10, a comparator 12, a recovery data generator 14 and a resampling clock generator 16. The front end device 10 is used to amplify and low-pass filter the front end signal $S_{input}$ so as to obtain an input analog signal $V_{in}$ which includes reduced high-frequency noise, and to provide an impedance match. The comparator 12 is used to compare the input analog signal $V_{in}$ with a threshold voltage $V_t$, which is approximately the midvalue of logic 1 and logic 0, so as to obtain a corresponding output binary signal $V_{out}$ representing logic values of the input analog signal $V_{in}$. The recovery data generator 14 is used to receive the output binary signal $V_{out}$ as the binary output $D_{out}$ of the front end signal $S_{input}$. The resampling clock generator 16, which may be provided by a phase-locked loop (PLL), is used to output a resampling clock CK according to the output binary signal $V_{out}$ for next-stage systems.

FIG. 2 (Prior Art) depicts the waveforms of each node of the circuit shown in FIG. 1. In this case, a periodic sine wave is used to represent the front end signal $S_{input}$. A mid-value of a positive voltage source and a negative voltage source is used to define the threshold voltage $V_t$ for convenience (when the positive voltage source is $V_{DD}$ and the negative voltage source is 0, the threshold voltage is chosen as $V_{DD}/2$). The sine wave is depicted in FIG. 2 with three possible values of the threshold voltage: $V_{t1}$, $V_{t2}$ and $V_{t3}$.

When the threshold voltage is at the value $V_{t1}$ shown in FIG. 2, which is approximately equal to the DC component of the front end signal $S_{input}$, the duty cycle (the ratio of the input analog signal $V_{in}$ read as logic one to the input analog signal read as either logic one or logic zero) of the input analog signal $V_{in}$ is approximately 50%. The resampling clock generator 16 always generates a resampling clock CK1 using a phase-locked loop (having a frequency twice that of the front end signal $S_{input}$ and having a duty cycle of 50%). Therefore, with the threshold so selected, the output digital signal $D_{out1}$, 101010 in this case and not shown in FIG. 2, can be obtained by sampling the output digital signal $V_{out1}$, from the comparator 12 at the correct timing.

However, a misreading may possibly occur in the circuit described above. This is due to an analog signal offset introduced when the signal $S_{input}$ is input to the front end device 10. When the threshold voltage $V_t$ remains at the mid-value of the positive and negative voltage sources, the threshold voltage $V_t$ can be lower (see, e.g., $V_{t2}$) or higher (see, e.g. $V_{t3}$) than the DC component of the front end signal $S_{input}$ entering the front end device 10 (i.e. the front end signal $S_{input}$ is shifted higher or lower) and the duty cycle of the input analog signal $V_{in}$ can consequently be greater than 75% or less than 25%. Since the resampling clock generator 16 still generates a resampling clock (CK2, CK3) having a duty cycle of 50%, a misreading therefore occurs when sampling the input analog signal $V_{in}$ using the negative edges of the resampling clock CK2, CK3. The output binary signal $D_{out2}$, $D_{out3}$ (not shown) in this case may be all logic one or all logic zero.

Many inventions in this area of technology are concerned with improving the front end device 10 to reduce the analog signal offset and the misreading caused thereby. However, it is difficult to improve the front end device 10 by analog circuit design since a low voltage-level and high-sensitivity circuit may be subject to interference by a variation in any component of the circuit. Consequently, most improvements are not suitable for batch process manufacturing.

SUMMARY OF THE INVENTION

An object of the present invention is to provide an analog signal offset cancellation circuit and method, which uses dynamic clock duty cycle to eliminate the misreading caused by the analog signal offset and to increase the reliability of the output digital signal $D_{out}$. In addition, the present invention is also suitable for devices which utilize low voltage-levels and/or high-sensitivity signals and which are manufactured by batch processing.

To achieve the above-indicated objects, the present invention provides an analog signal offset cancellation circuit featuring a front end device, a comparator, a sampling device, a recovery data generator and a resampling clock generator. In this offset cancellation circuit, the front end device is primarily used to receive an input analog signal. The comparator is used to compare the input analog signal with a threshold voltage so as to obtain an output binary signal. The sampling device is used to sample the output binary signal under the control of a sampling signal having a frequency N times that of the output binary signal to obtain sample data. The resampling clock generator 28 is used to sequentially read 2N samples of the sample data for two data period and output two 50% duty cycle output clock and a dynamic duty cycle clock ($CK_{re}$) for data recovery. The recovery data generator is a device logic to generate the output data based on the sampling data. The first resampling clock data is always aligned with the rising edge (or falling) of the comparator output (can be implemented with the D-type Flip Flop reset pin). The resampling clock generator continues sampling the uninterrupted logic one (or logic zero) for 2N samples for the output data and clock timing reference. The resampling clock (28) and recovery data generator counts the number of ones (zeros) of the sample data for this two data period and outputs the offset compensation clock and data signals, respectively according to the sampled data. The resampling clock circuit also provides the dynamic duty cycle clock for data recovery.

The sampling device of the present invention can be implemented by using a D flip flop, with its input (D) connected to the comparator output, its clock terminal (CLK) connected to the sampling clock having a frequency N times that of the output binary signal, and its output (Q) serving as the sample data. The resampling clock generator can be achieved by a logic circuit. The front end device can be an amplifier or a low-pass filter.

BRIEF DESCRIPTION OF THE DRAWINGS

The detailed description will best be understood in conjunction with the accompanying drawings, in which.

DESCRIPTION OF THE PREFERRED EMBODIMENT

This detailed description is given by way of example and not intended to limit the invention solely to the embodiment described.

Figure 1:
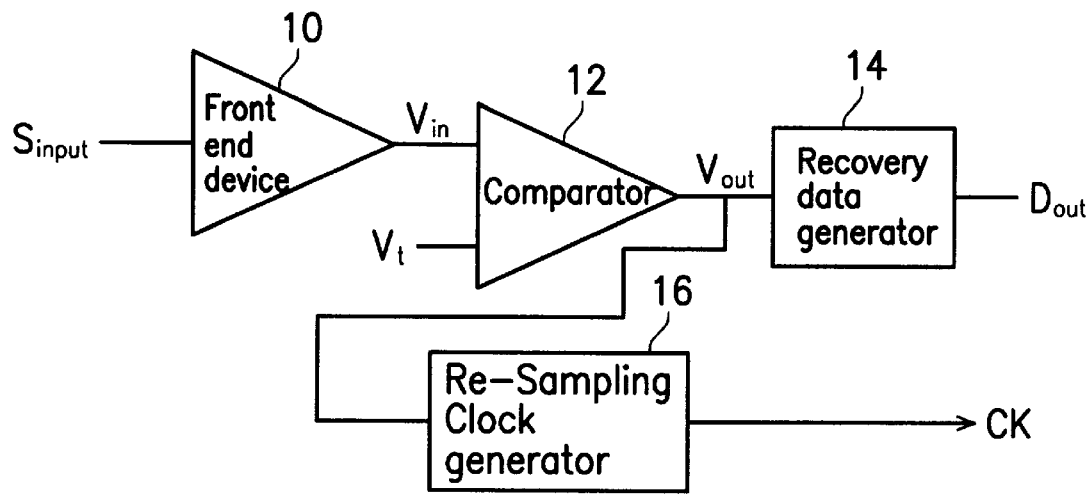
FIG. 1 (Prior Art) is a circuit diagram of a conventional circuit for converting an analog signal into a digital signal.
Figure 2:
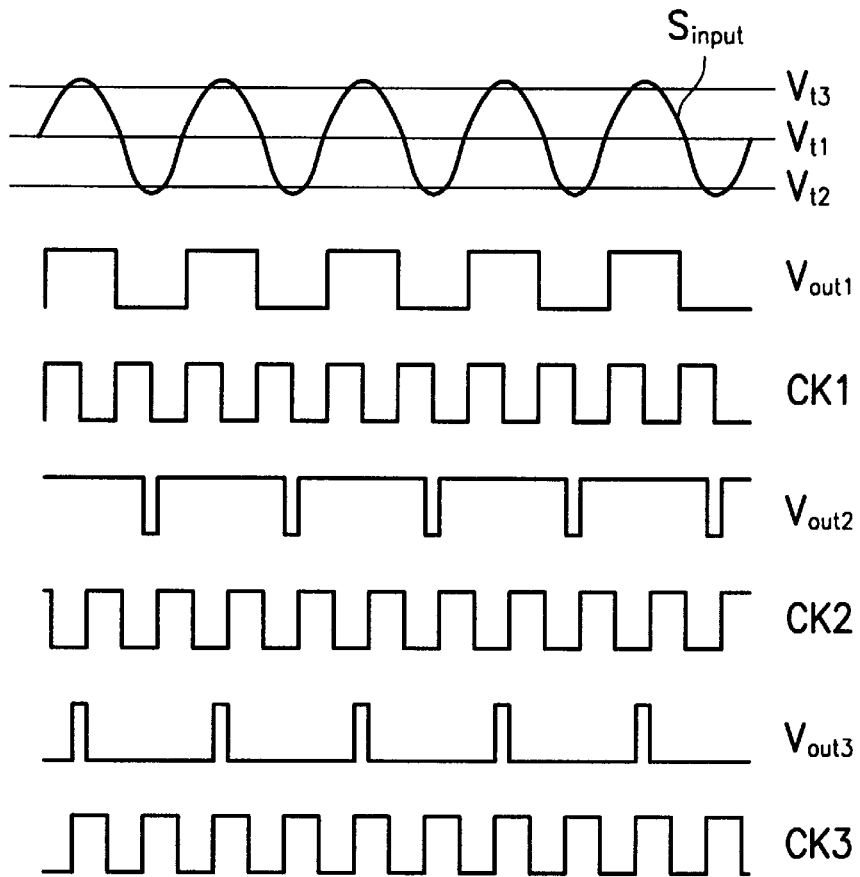
FIG. 2 (Prior Art) depicts waveforms of certain nodes of the circuit shown in FIG. 1 under three different threshold voltage conditions.
Figure 3:
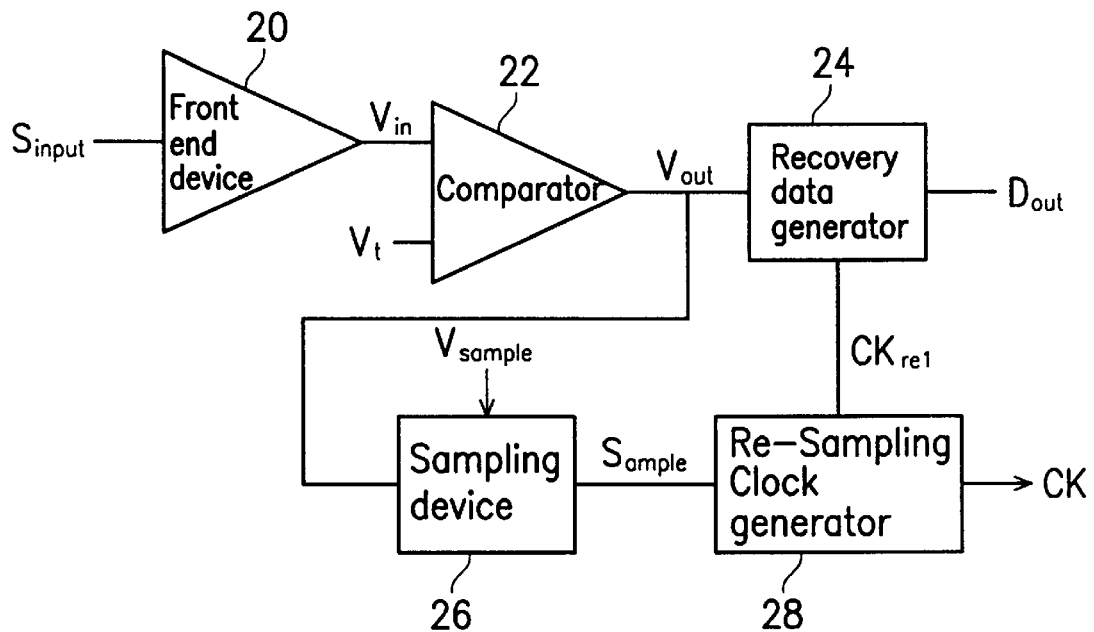
FIG. 3 is a circuit diagram of the present invention for converting an analog signal into a digital signal.

FIG. 3 is a circuit of the present invention for converting a front-end signal into a digital signal. The circuit consists of a front end device 20, a comparator 22, a recovery data generator 24, a sampling device 26 and a resampling clock generator 28.

In this embodiment, the front end device 20 can be an amplifier or a low-pass filter for receiving and low-pass filtering an analog front end signal $S_{input}$ so as to obtain an analog signal $V_{in}$ having lower high-frequency noise and which is impedance matched.

The comparator 22, which is preferably a voltage comparator, is then used to compare the analog signal $V_{in}$ with a threshold voltage $V_t$ (usually, the threshold voltage $V_t$ is chosen as the mid-value of the positive voltage source $V_{DD}$ (logic one) and the negative voltage source 0 (logic zero), that is, $V_{DD}/2$) so as to obtain a corresponding output binary signal $V_{out}$ representing the logic values of the analog signal $V_{in}$.

The sampling device 26 then is provided for sampling the output binary signal $V_{out}$ using a sampling clock $V_{sample}$ having a frequency N times that of the output binary signal $V_{out}$ so as to obtain sample data. N is selected as 8, in this example, to illustrate the further operation.

The first sampling clock is aligned with the rising (or falling) edge of the comparator output data $V_{out}$. Then, the resampling clock generator 28 continues reading (2N−1) samples of the sampled data and counts the number of uninterrupted logic one (or zero) samples of these 2N samples, and outputs a two period clock $CK_{re1}$ to the recovery data generator for the data output $D_{out}$. The recovery data generator 24 is used to output a recovery data $D_{out}$ by sampling the output binary signal $V_{out}$ with reference to the negative edges of the resampling clock $CK_{re1}$ obtained from the resampling clock generator 28.

The re-sampling clock generator 28 also outputs a recovery clock CK of 50% duty ratio, which is triggered by the negative edges of the resampling clock $CK_{re1}$. The output clock CK is then transmitted with the recovery data $D_{out}$ of the recovery data generator 24 and used as the sampling clock of the recovery data $D_{out}$ for later use.

The present invention will now be explained with reference to a first example wherein the front-end signal is assumed to be a periodic sine wave Sinput, having a mean value of $V_{DD}/2$; the threshold voltage is selected to be $V_{DD}/2$, (the positive and negative voltage sources are $V_{DD}$ and 0, respectively) and the sampling signal $V_{sample}$ has a frequency N times (e.g. N=8) that of the output binary signal $V_{out}$.

Figure 4A:
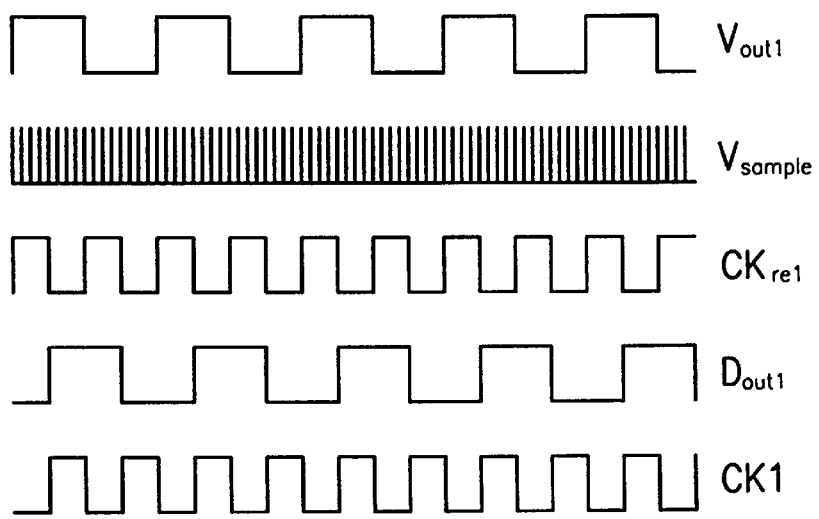
FIG. 4A depicts waveforms of certain nodes of the circuit shown in FIG. 3 when the duty cycle of Vout is approximately equal to 50%.
Figure 4B:
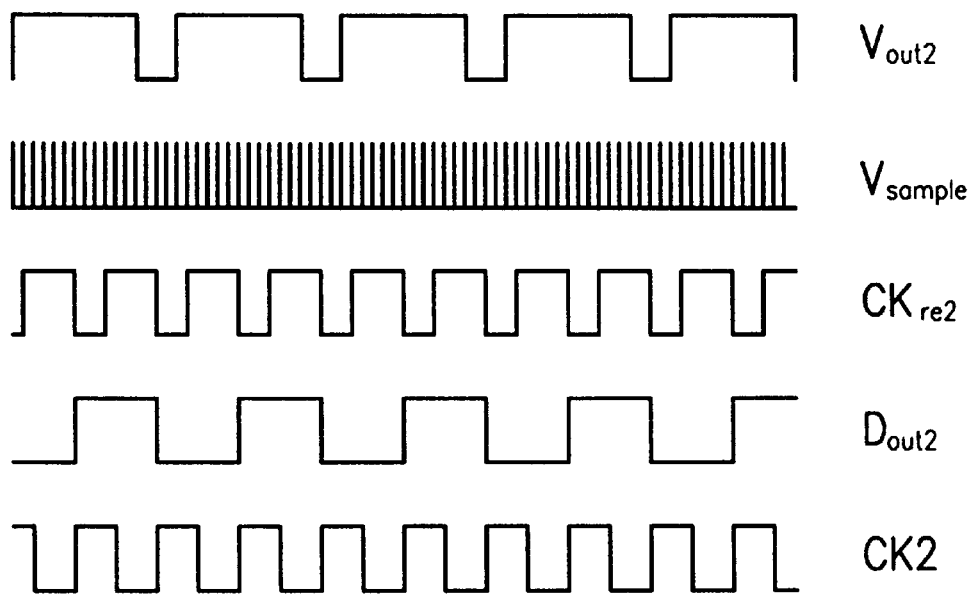
FIG. 4B depicts waveforms of certain nodes of the circuit shown in FIG. 3 when the duty cycle of Vout is greater than 75%.
Figure 4C:
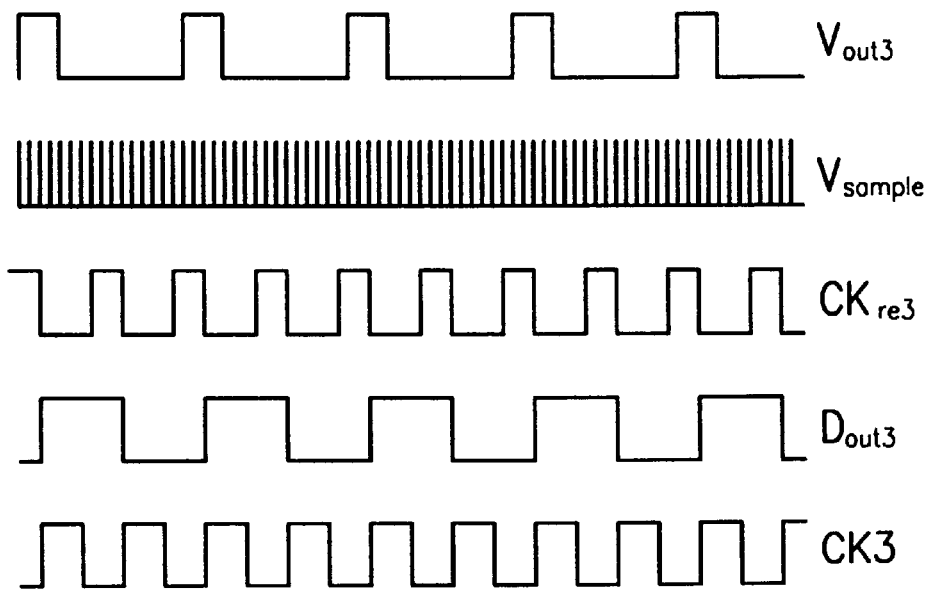
FIG. 4C depicts waveforms of certain nodes of the circuit shown in FIG. 3 when the duty cycle of Vout is less than 25%.

FIGS. 4A, 4B and 4C are diagrams depicting waveforms of certain nodes of the circuit shown in FIG. 3 when the duty cycle is approximately equal to 50%, greater than 75%, and less than 25%, respectively.

When the threshold voltage ($V_{t1}$ with reference to FIG. 4A) is approximately equal to the DC component of $V_{in}$ which is derived from the signal Sinput, comparing $V_{in}$ with $V_t$ by means of the comparator 22 yields an output binary signal $V_{out1}$ having a duty cycle of about 50%. That is, $S_{input}$ under these circumstances will be judged to be "one" about 50% of the time.

Figure 5:
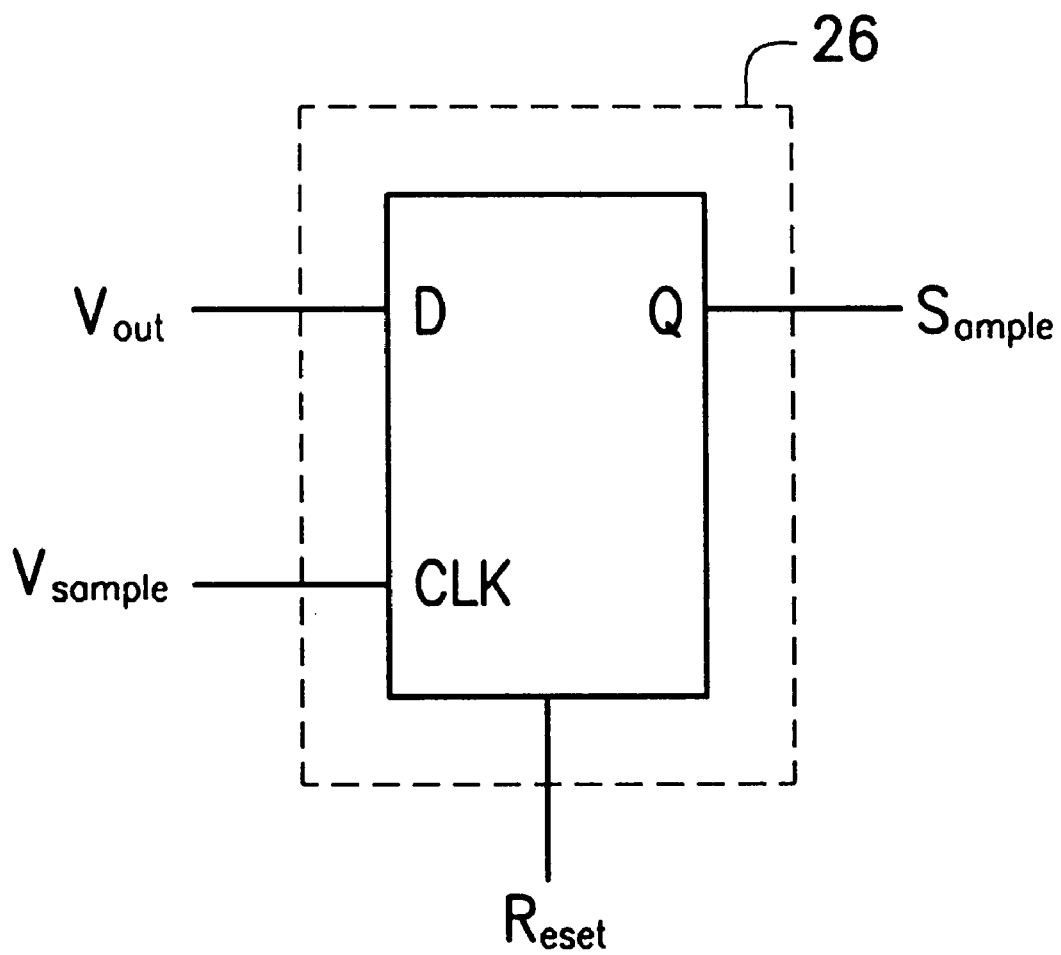
FIG. 5 depicts a circuit diagram of an example of the sampling device in the present invention.

Next, the sampling device 26 over-samples the output binary signal $V_{out1}$ using a sampling signal $V_{sample}$ having a frequency N (8 in this example) times that of the output binary signal $V_{out1}$ (described above) to obtain sample data Sample (not shown and approximately identical to $V_{sample}$). In this embodiment, the first sample obtained by the sampling device 26 is aligned with the positive edges of the output binary signal $V_{out}$. The sampling device 26, preferably a D flip flop, is reset after sampling 2N samples. As shown in FIG. 5, the input terminal (D) of the D flip flop is connected to the output binary signal $V_{out}$, the clock terminal (CLK) of the D flip flop is connected to the sampling signal $V_{sample}$, and the output terminal (Q) of the D flip flop is to serve as the sample data Sample. The first sampling clock is aligned with rising edge of the comparator output data $V_{out}$.

The resampling clock generator 28 then continues sampling 15 (2N−1) samples of the sample data Sample, counts the number of uninterrupted logic one samples of these 2N samples and outputs a recovery clock CK1. The timing of the recovery clock CK1 is determined by the falling edges of the resampling clock $CK_{re1}$. The rising edge position of CK1 is the same position as the falling edge positions of $CK_{re1}$.

The resampling clock generator 28 is reset every 2N samples and counts the number of uninterrupted logic one samples of these 2N samples (16 in this example) to output a two period resampling clock $CK_{re1}$. Suppose p samples (8 in this example) out of these 2N (16) samples are measured as logic one as shown in FIG. 4A. The resampling clock generator 28 then generates a two period sampling clock with its falling edges at (p+1)/2 (round to 5th) and ((p+1)/2+N) (round to 13th) and its positive edge at ((p+1)/2−N/2) (1st) and ((p+1)/2+N/2)th (9th). Consequently, the recovery data generator 24 can use the falling edges of the resampling clock $CK_{re1}$ to output the clock CK1 as shown in FIG. 4A, which is provided with reference to the falling edges of the resampling clock generator 28 and transmitted with the recovery data $D_{out1}$ for synchronization in subsequent stages.

FIG. 4B and 4C are similar cases as FIG. 4A except that $V_{in}$ is offset from $V_t$ resulting in an output binary signal $V_{out}$ with a duty cycle greater than 75% or less than 25%. For clarity, each signal of FIG. 4B subscripts 2 (for the case where the offset makes the output binary signal $V_{out}$ have a duty cycle larger than 75%); while each signal of FIG. 4C subscripts 3 (for the case where the offset makes the output binary signal $V_{out}$ have a duty cycle less than 25%).

As shown in FIG. 4B, when $V_{in}$ is offset from $V_t$ resulting in an output binary binary signal $V_{out}$ with a duty cycle greater than 75%, $V_{sample}$ of the sampling device 26 is also used to sample $V_{out}$ from the comparator 22 and measures the number of uninterrupted logic one. The logic one samples in this example is 12. So, the resampling clock generator 28 can obtain a resampling signal $CK_{re2}$ with its rising edge at positions of $2^{nd}$ and $10^{th}$ samples and its falling edges at the $7^{th}$ and the $15^{th}$ samples. The resampling signal $CK_{re2}$ is then used in the recovery data generator 24 to obtain the recovery data $D_{out2}$.

Similar operations can also be applied to the condition when $V_{in}$ is offset from $V_t$ resulting in an output binary binary signal $V_{out}$ with a duty cycle smaller than 25% as shown in FIG. 4C and thus will be skipped.

Summing up the above, the present invention can eliminate analog signal offset through use of a dynamic recovery clock duty cycle and reduce the effect of each component on the whole circuit by means of digital circuit design.

The foregoing description of a preferred embodiment of the present invention has been provided for the purposes of illustration and description only. It is not intended to be exhaustive or to limit the invention to the precise forms disclosed. Many modifications and variations will be apparent to practitioners skilled in this art. The embodiment was chosen and described to best explain the principles of the present invention and its practical application, thereby enabling those who are skilled in the art to understand the invention for various embodiments and with various modifications as are suited to the particular use contemplated. It is intended that the scope of the invention be defined by the following claims and their equivalents.

What is claimed is:

1. An analog signal offset cancellation circuit, comprising:
   a front end device receiving an input analog signal;
   a comparator comparing the input analog signal with a threshold voltage to obtain an output binary signal;
   a sampling device for sampling the output binary signal using a sampling clock having a frequency N times that of the output binary signal to obtain sample data;
   a resampling clock generator for continually reading 2N samples of the sample data and outputting a two period resampling clock with its rising and falling edges determined by the edges and the number of uninterrupted logic one of the 2N samples and remained unchanged when the 2N samples are all logic one or all logic zero; and
   a recovery data generator for sampling the output binary signal with reference of the resampling clock to obtain recovery data.

2. The analog signal offset cancellation circuit as claimed in claim 1, wherein the sampling device is a D flip flop with an input (D) connected to the output binary signal, a clock terminal (CLK) connected to the sampling signal having a frequency N times that of the output binary signal, and an output (Q) serving as the sample data.

3. The analog signal offset cancellation circuit as claimed in claim 1, wherein the resampling clock generator is a logic circuit.

4. The analog signal offset cancellation circuit as claimed in claim 1, wherein the front end device is an amplifier.

5. The analog signal offset cancellation circuit as claimed in claim 1, wherein the front end device is a filter.

6. An analog signal offset cancellation method, comprising:
   receiving an input analog signal;
   comparing the input analog signal with a threshold voltage to obtain an output binary signal;
   sampling the output binary signal using a sampling signal having a frequency N times that of the output binary signal to obtain sample data;
   providing a resampling clock generator for continually reading 2N samples of the sample data and outputting a two period resampling clock with its rising and falling edges determined by the edges and the number of uninterrupted logic one samples of the sample data and remained unchanged when the 2N samples are all logic one or all logic zero; and
   providing a recovery data generator for sampling the output binary signal with reference of the resampling clock to obtain recovery data.

7. The analog signal offset cancellation method as claimed in claim 6, wherein the sample data is obtained using a D flip flop with an input (D) connected to the output binary signal, a clock terminal (CLK) connected to the sampling signal having a frequency N times that of the output binary signal, and an output (Q) serving as the sample data.

8. The analog signal offset cancellation method as claimed in claim 6, wherein the resampling clock generator is achieved by a logic circuit.

9. The analog signal offset cancellation method as claimed in claim 6, wherein the input analog signal is received from a front end device.

10. The analog signal offset cancellation method as claimed in claim 9, wherein the front end device is an amplifier.

11. The analog signal offset cancellation method as claimed in claim 9, wherein the front end device is a filter.

* * * * *